US011885230B2

(12) United States Patent
Joo et al.

(10) Patent No.: US 11,885,230 B2
(45) Date of Patent: Jan. 30, 2024

(54) AIRFOIL WITH INTERNAL CROSSOVER PASSAGES AND PIN ARRAY

(71) Applicant: DOOSAN HEAVY INDUSTRIES & CONSTRUCTION CO., LTD., Changwon-si (KR)

(72) Inventors: Hyunwoo Joo, Changwon-Si (KR); W. David Day, Jupiter, FL (US); Walter Marussich, Jupiter, FL (US); Jeff Greenberg, Stuart, FL (US)

(73) Assignee: DOOSAN HEAVY INDUSTRIES & CONSTRUCTION CO. LTD., Changwon-si (KR)

( * ) Notice: Subject to any disclaimer, the term of this patent is extended or adjusted under 35 U.S.C. 154(b) by 0 days.

(21) Appl. No.: 17/203,360

(22) Filed: Mar. 16, 2021

(65) Prior Publication Data

US 2022/0298928 A1 Sep. 22, 2022

(51) Int. Cl.

| | |
|---|---|
| ***F01D 25/12*** | (2006.01) |
| ***F01D 9/04*** | (2006.01) |
| ***F01D 5/18*** | (2006.01) |

(52) U.S. Cl.

CPC ............. *F01D 25/12* (2013.01); *F01D 5/187* (2013.01); *F01D 9/041* (2013.01); *F05D 2220/32* (2013.01); *F05D 2230/21* (2013.01); *F05D 2240/12* (2013.01); *F05D 2260/201* (2013.01); *F05D 2260/202* (2013.01)

(58) Field of Classification Search

CPC .......... F01D 5/187; F01D 9/041; F01D 25/12; F05D 2220/32; F05D 2240/12; F05D 2260/201; F05D 2260/202; F05D 2260/2212

See application file for complete search history.

(56) References Cited

U.S. PATENT DOCUMENTS

| | | | | |
|---|---|---|---|---|
| 3,628,880 A * | 12/1971 | Smuland | F01D 5/189 | 415/115 |
| 3,628,885 A * | 12/1971 | Sidenstick | F01D 5/20 | 416/193 A |
| 4,938,805 A * | 7/1990 | Haydon | C22C 19/07 | 428/668 |
| 5,248,240 A * | 9/1993 | Correia | F01D 9/042 | 415/209.1 |
| 5,609,466 A * | 3/1997 | North | F01D 5/187 | 415/115 |
| 6,179,565 B1 * | 1/2001 | Palumbo | F01D 5/187 | 415/115 |
| 6,200,087 B1 * | 3/2001 | Tung | F01D 5/186 | 415/115 |
| 6,254,347 B1 * | 7/2001 | Shaw | B23H 9/10 | 416/97 R |

(Continued)

*Primary Examiner* — Courtney D Heinle
*Assistant Examiner* — Danielle M. Christensen
(74) *Attorney, Agent, or Firm* — SHOOK, HARDY & BACON L.L.P.

(57) ABSTRACT

An airfoil for a gas turbine engine. The airfoil includes a unique cooling path for a coolant, routing the coolant through a cooling cavity, through a column of crossover passages and through a pin array near a trailing edge of the airfoil. The crossover passages produce impingement cooling and the pin array produces convective cooling. This combination of impingement cooling and convective cooling results in increased cooling of the airfoil and better aeromechanical life objectives.

12 Claims, 8 Drawing Sheets

(56) References Cited

U.S. PATENT DOCUMENTS

| | | | | |
|---|---|---|---|---|
| 6,824,359 | B2 * | 11/2004 | Chlus | F01D 5/20<br>416/97 R |
| 7,021,893 | B2 * | 4/2006 | Mongillo, Jr. | F01D 5/187<br>415/115 |
| 8,231,329 | B2 | 7/2012 | Benjamin et al. | |
| 10,753,210 | B2 * | 8/2020 | Jennings | F01D 9/065 |
| 2008/0286115 | A1 * | 11/2008 | Liang | F01D 5/186<br>416/97 R |
| 2009/0245999 | A1 * | 10/2009 | Flodman | F01D 5/189<br>415/115 |

* cited by examiner

AIRFOIL WITH INTERNAL CROSSOVER PASSAGES AND PIN ARRAY

TECHNICAL FIELD

The present invention generally relates to components for a gas turbine engine. More specifically, the present invention relates to an airfoil for turbine components, such as blades and/or nozzles.

BACKGROUND

Gas turbine engines, such as those used for power generation or propulsion, include at least a compressor section, a combustor section and a turbine section. The turbine section includes a plurality of blades that extend away from, and are radially spaced around, an outer circumferential surface of a number of rotor discs. Typically, adjacent each plurality of blades is a plurality of nozzles. The plurality of nozzles usually extend from, and are radially spaced around, a shroud assembly.

The turbine components are subjected to mechanical and thermal stresses that cause inefficiencies and part degradation. It is an on-going goal to reduce the thermal stresses on the compressor components to allow the compressor components to better withstand the operating environment. One method for reducing the thermal stresses is to cool the airfoils as much as possible. One method for cooling the airfoils is to move a coolant, such as air, through an internal cooling cavity in the airfoil. As the coolant moves through the internal cavity of the airfoil it cools the exposed surfaces within the internal cavity through convection. While these existing cooling methods are somewhat effective, it would be desirable to add cooling capacity to the airfoils to further, or more effectively, reduce the thermal load on the airfoil. In addition, increased cooling capacity allows the turbine to operate at higher temperatures, which results in additional power generation by the hot gas flow.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes an airfoil for gas turbine engine components, e.g., turbine components such as blades and nozzles. The airfoil includes a unique cooling path for a coolant, routing the coolant through a cooling cavity, through a column of crossover passages and through a pin array near a trailing edge of the airfoil. The crossover passages produce impingement cooling and the pin array produces convective cooling. This combination of impingement cooling and convective cooling results in increased cooling of the airfoil and better aeromechanical life objectives. The increased cooling capacity allows the turbine to operate at higher temperatures, which results in additional power generation.

BRIEF DESCRIPTION OF THE DRAWINGS

The embodiments disclosed herein relate to compressor component airfoil designs and are described in detail with reference to the attached drawing figures, which illustrate non-limiting examples of the disclosed subject matter, wherein.

DETAILED DESCRIPTION

The subject matter of this disclosure is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies.

In brief, and at a high level, this disclosure describes gas turbine engine components, e.g., turbine components such as blades and nozzles. The airfoil includes a unique cooling path for a coolant, routing the coolant through a cooling cavity, through a column of crossover passages and through a pin array near a trailing edge of the airfoil. The crossover passages produce impingement cooling and the pin array produces convective cooling. This combination of impingement cooling and convective cooling results in increased cooling of the airfoil and better aeromechanical life objectives.

Figure 1:
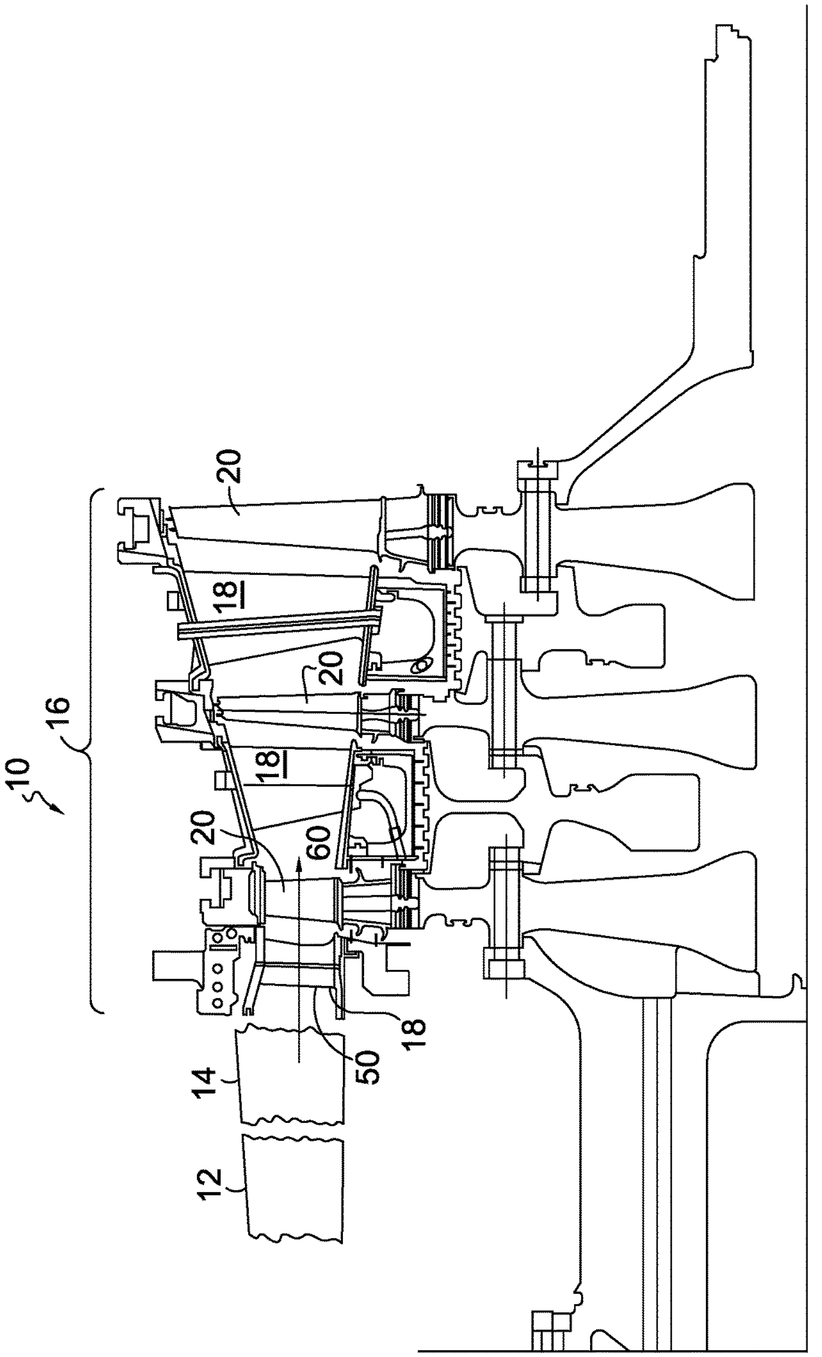
FIG. 1 depicts a schematic view of a gas turbine engine, in accordance with aspects hereof.

Referring now to FIG. 1, there is illustrated a cross-section view of one aspect of a gas turbine 10, for context. Certain components of gas turbine 10 are shown schematically. For example, gas turbine 10 typically has at least a compressor section 12 (represented schematically), a combustor section 14 (represented schematically) and a turbine section 16. In the compressor section 12, the air is compressed and passed to combustor section 14. In combustor section 14, the air is mixed with fuel and ignited to generate a high pressure and high temperature exhaust gas stream. This exhaust gas stream flows through a hot gas flow path (indicated by arrow 60) of the turbine section 16 and expands through the turbine section 16, where energy is extracted, as generally known by those of skill in the art. The turbine section 16 contains a number of stages that each typically include a turbine nozzle 18 and a turbine blade 20.

Figure 2:
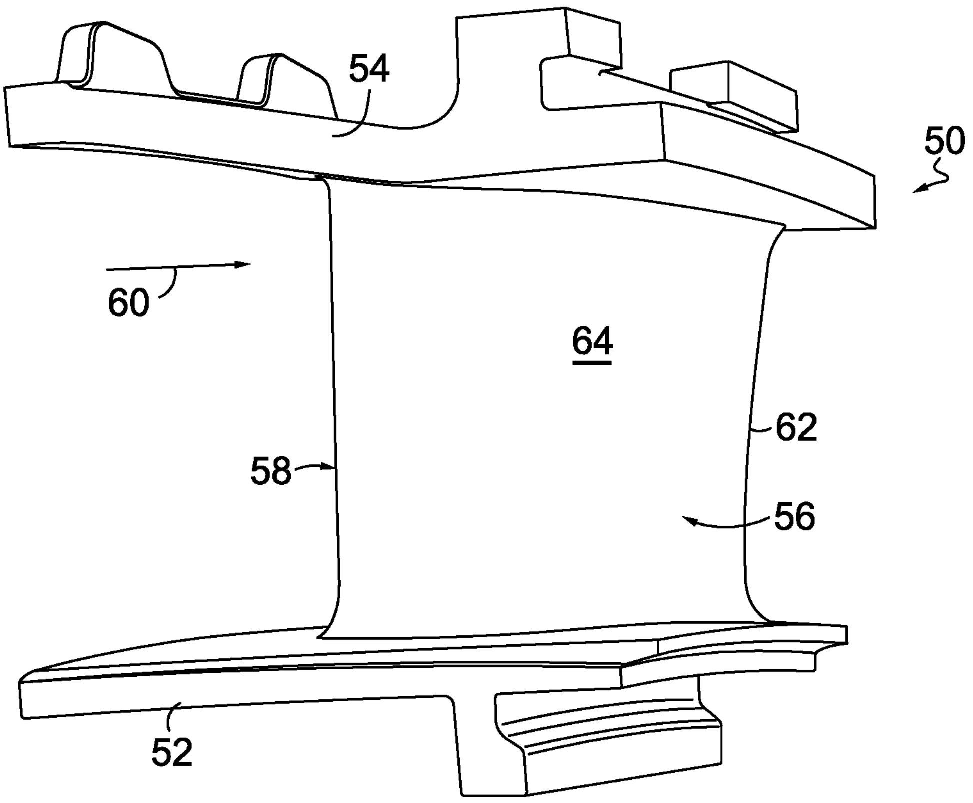
FIG. 2 depicts a perspective view of portions of a suction side of a turbine nozzle, in accordance with aspects hereof.
Figure 3:
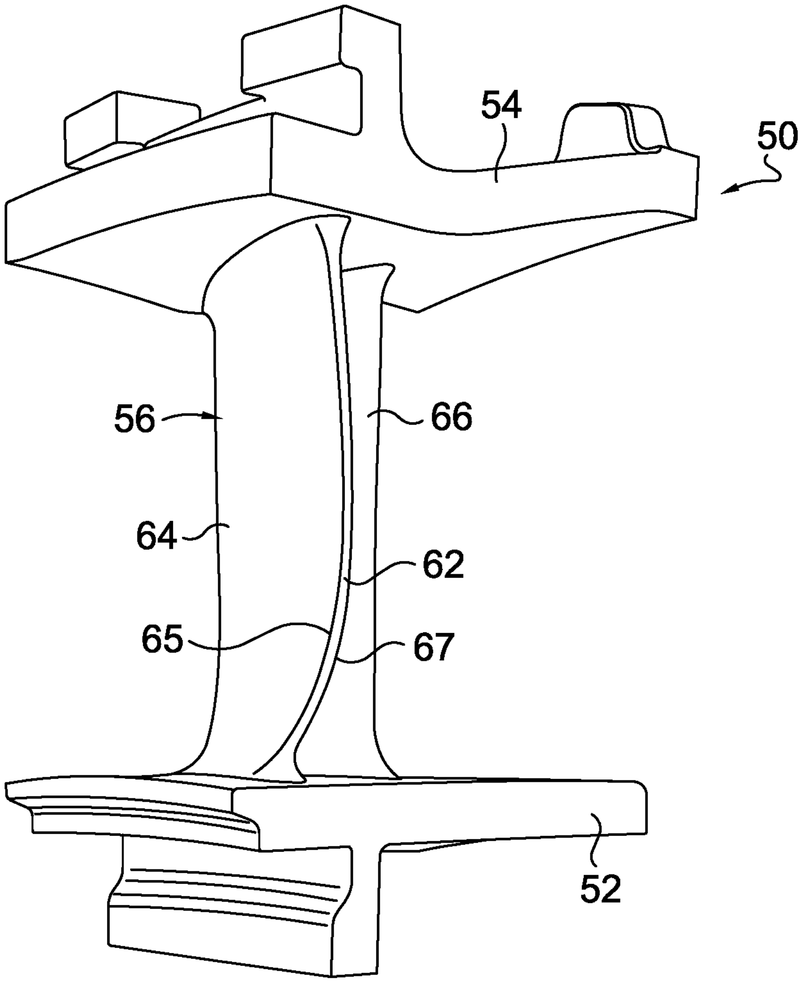
FIG. 3 depicts a rear perspective view of a turbine nozzle, showing portions of the suction side and portions of the pressure side of the turbine nozzle of FIG. 2, in accordance with aspects hereof.

One of the components of the first stage of turbine section 16 is a turbine nozzle 50, as depicted in FIGS. 2-7. As best seen in FIGS. 2 and 3, the turbine nozzle 50 includes an inner platform 52 and an outer platform 54 configured to secure the turbine nozzle 50 in position downstream of the combustor section 14. The inner platform 52 and the outer platform 54 are configured to allow multiple turbine nozzles 50 to be coupled adjacent to one another, forming an annulus, as is known to those of skill in the art.

An airfoil 56 extends between the inner platform 52 and the outer platform 54. As best seen in FIG. 2, the airfoil 56 has a leading edge 58 that first interacts with the hot gas flow path (as indicated by the directional arrow 60). The airfoil 56 transitions from the leading edge 58 to a trailing edge 62, as best seen in FIG. 3. On one side of the airfoil 56, a suction sidewall 64 extends from the leading edge 58 to the trailing edge 62, the suction sidewall 64 having an edge 65 along the trailing edge 62. In one aspect, the suction sidewall 64 is convex. On the opposite side of the airfoil 56, a pressure sidewall 66 extends from the leading edge 58 to the trailing edge 62, the pressure sidewall 66 having an edge 67 along the trailing edge 62. In one aspect, the pressure sidewall 66 is concave. The concave pressure sidewall 66 and the convex suction sidewall 64 effect desired corresponding surface velocities of the air flowing over the airfoil 56. Because the airfoil 56 is in the hot gas flow path 60, it is subjected to thermal stresses. It is therefore desirable to cool the airflow 56 as much as possible, as efficiently as possible.

Figure 4:
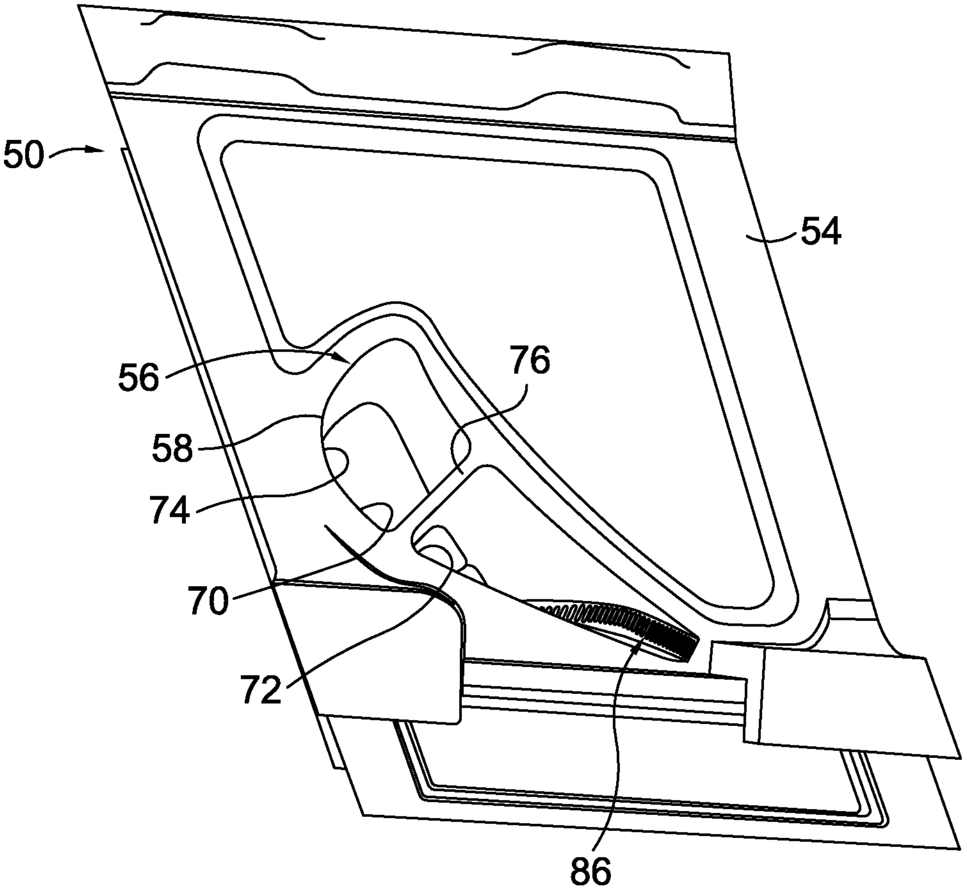
FIG. 4 depicts a top view of the turbine nozzle of FIG. 2, in accordance with aspects hereof.
Figure 5:
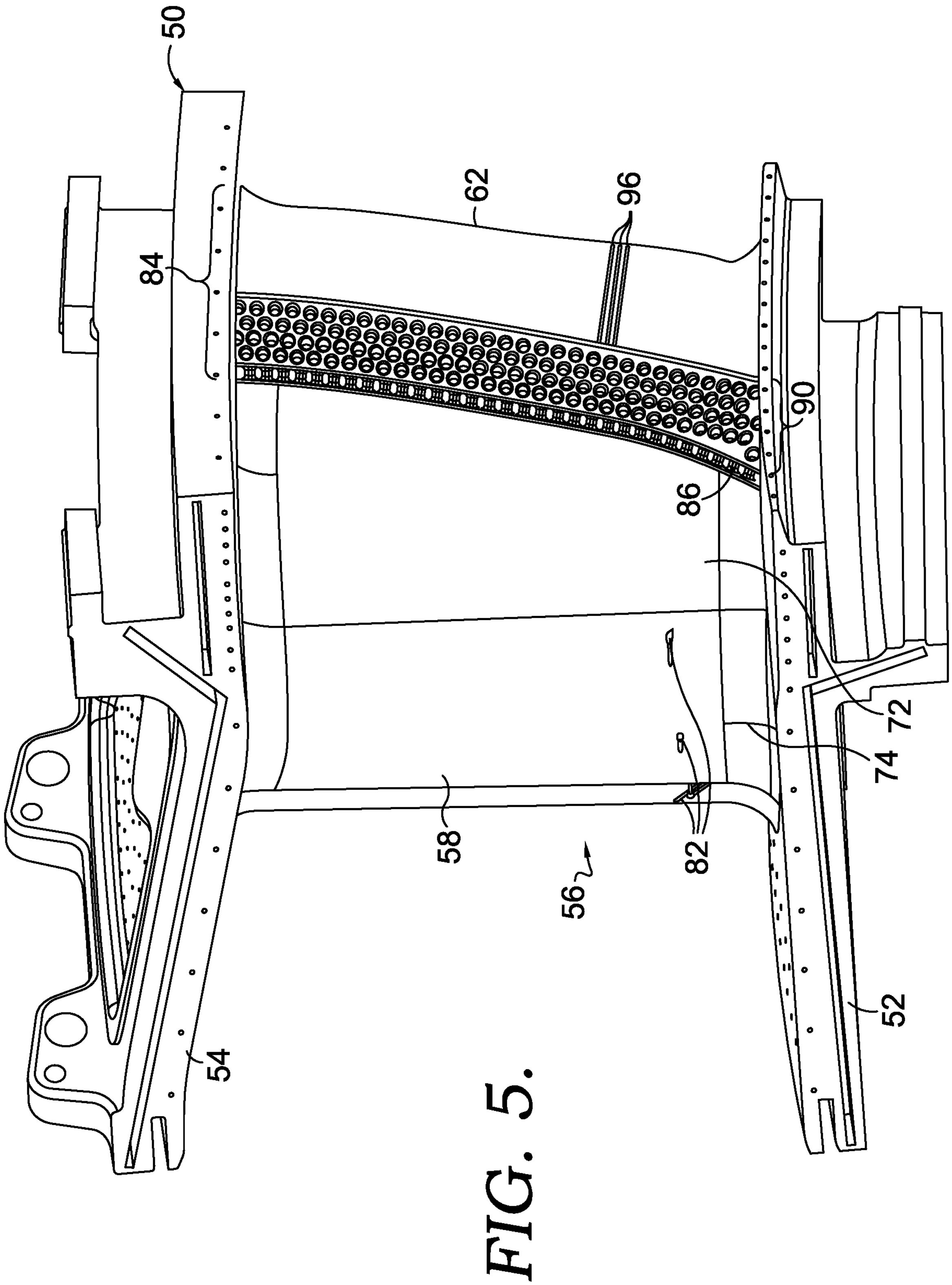
FIG. 5 depicts a perspective view of a suction side of the turbine nozzle of FIG. 2, but with the suction sidewall transparent to show inner details of construction, in accordance with aspects hereof.
Figure 6:
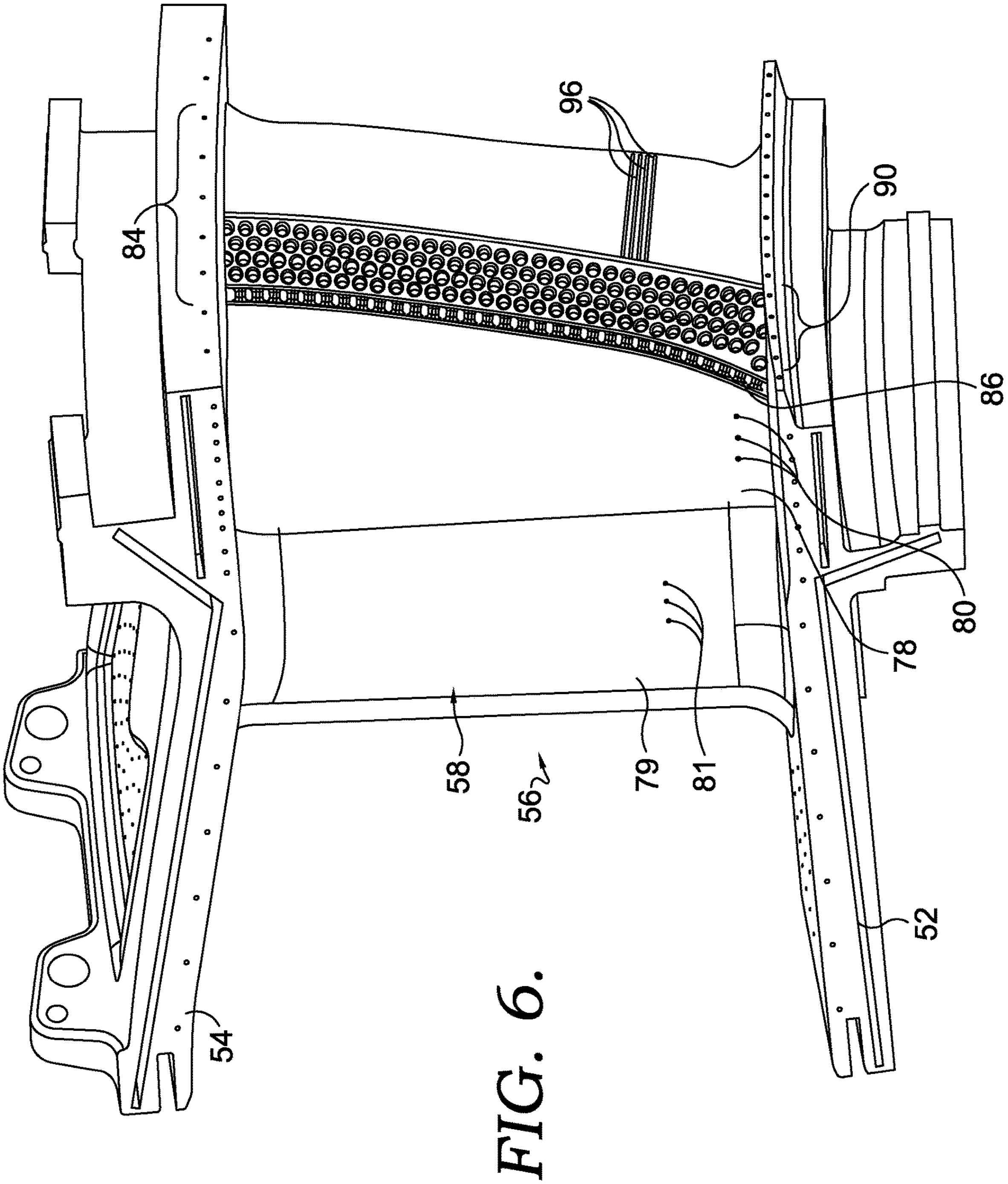
FIG. 6 depicts a view similar to FIG. 5, but also showing the outer face of an insert, in accordance with aspects hereof.
Figure 7A:
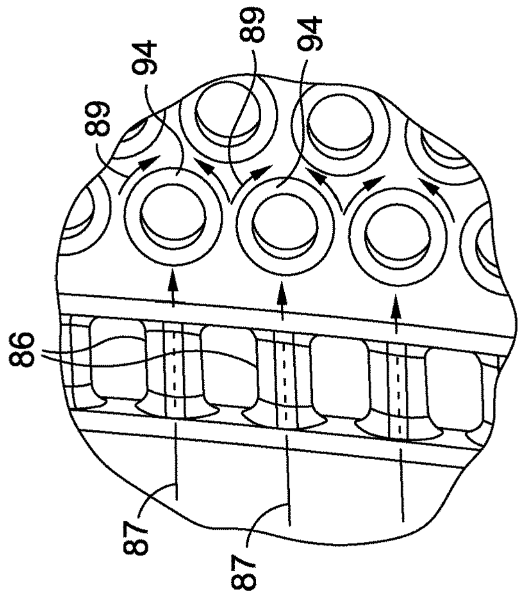
FIG. 7A depicts an enlarged portion of FIG. 7, in accordance with aspects hereof.
Figure 7:
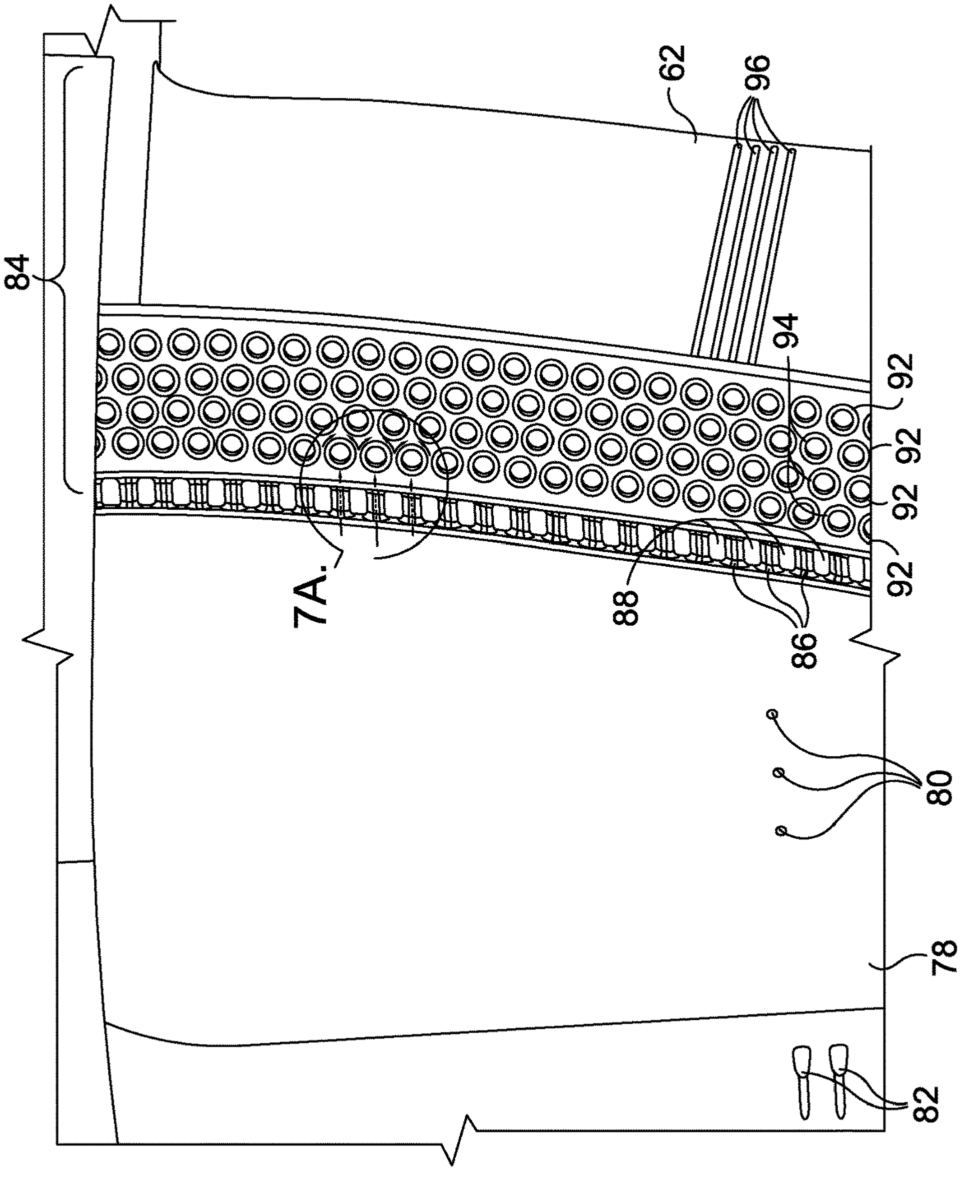
FIG. 7 depicts an enlarged view of portions of FIG. 6, in accordance with aspects hereof.

As best seen in FIG. 4, the airfoil 56 is hollow, with the suction sidewall 64 and the pressure sidewall 66 forming a hollow cooling cavity 70. In some aspects, cooling cavity 70 is divided into a first cooling cavity 72 and a second cooling cavity 74 by a rib wall 76. The airfoil 56 is provided with a coolant (such as compressed air at ambient temperatures) that is directed into the cooling cavity 70. In some aspects, an insert 78 is placed within at least first cooling cavity 72. FIG. 5 depicts the airfoil 56 without the insert 78, and FIGS. 6 and 7 depict the airfoil 56 with the insert 78. The insert 78 is also hollow, and is provided with a number of cooling apertures 80. In some aspects, the cooling apertures 80 are spaced relatively equally along the outer surface of the insert 78. The cooling apertures 80 eject the coolant, such as air, at an increased velocity, to impinge the air against an inner wall of the turbine nozzle 50 (such as the inner side of the suction sidewall 62 and/or the inner side of pressure sidewall 64) so as to enhance the cooling of the airfoil 56.

The suction sidewall 62 and the pressure sidewall 64 also have, in some aspects, additional film cooling apertures 82. The film cooling apertures 82 allow the coolant to exit the cooling cavity 70 and form a layer or film of cooling air on the exterior surface of the airfoil 56 to shield it from the hot gas flowing past.

Adjacent the trailing edge 62, the first cooling cavity 72 has an exit section 84 as best seen in FIGS. 5-7. Exit section 84 communicates the coolant from cooling cavity 72, through a number of crossover passages 86 defined by a number of crossover walls 88, through a pin array 90, and out of the airfoil 56 via exit ports 96, as best seen in FIGS. 7 and 7A. In one aspect, the crossover walls 88 defining the crossover passages 86 are formed in nozzle 50 during the casting process. The pin array 90 is positioned after crossover passages 86 in the exit section 84. In some aspects, the pin array 90 is an array with four columns 92 of individual pins 94. In some aspects, the pins 94 of adjacent columns 92 are offset, such that the pins 94 of adjacent columns 92 are not in alignment. It should be understood that more or fewer columns 92 of pins 94 may be provided in the pin array 90. Because the crossover passages 86 are in-line with the flow of the coolant, the air flows through the crossover passages 86 in the same direction of flow as indicated by arrows 87 in FIG. 7A. When the cooling air hits the pin array 90, because the pins are perpendicular to the flow of cooling air, the cooling air is forced around the pins 94 as indicated by arrows 89 in FIG. 7A. This arrangement of the crossover passages 86 followed by the pin array 90 results in convection cooling through the crossover passages 86 (along arrow 87), along with impingement cooling on the first column 92 after the crossover passages 86, followed by convection cooling as the air flows around the pins 94 of the pin array 90 (along arrows 89). The impingement provided by the crossover passages 86 thus enhances the cooling in the exit section 84 of the airfoil 56. While the crossover passages 86 are shown equally spaced in the figures, alternate spacing of the crossover passages 86 could be used, in some aspects. Additionally, the cross-section of crossover passages 86 could be circular, in some aspects, but could be other shapes as well. Similarly, in some aspects, pins 94 are cylindrical, but could be other shapes as well. While the exit section 84 has been described with respect to nozzle 50, similar cooling configurations could be utilized on a turbine blade as well, in some aspects.

As best seen in FIG. 7, following the pin array 90, the exit section 84, in some aspects, has a number of exit ports 96 that allow the cooling air to leave the airfoil 56 at the trailing edge 62. The exit ports 96 are not shown in FIG. 3, but can be seen in FIGS. 5-7. In some aspects, the exit ports 96 may be machined into the nozzle 50 after the nozzle 50 is cast. In one aspect, the exit ports 96 may be made with an EDM plunge.

By providing the airfoil 56 with the cooling arrangement of the crossover passages 86, along with the pin array 90, added cooling is provided in the exit section 84, as compared to an airfoil with only the convective cooling provided by a pin array. This more effective cooling provides impingement (due to the crossover passages 86) and convective cooling (at least through the pin array 90).

Figure 8:
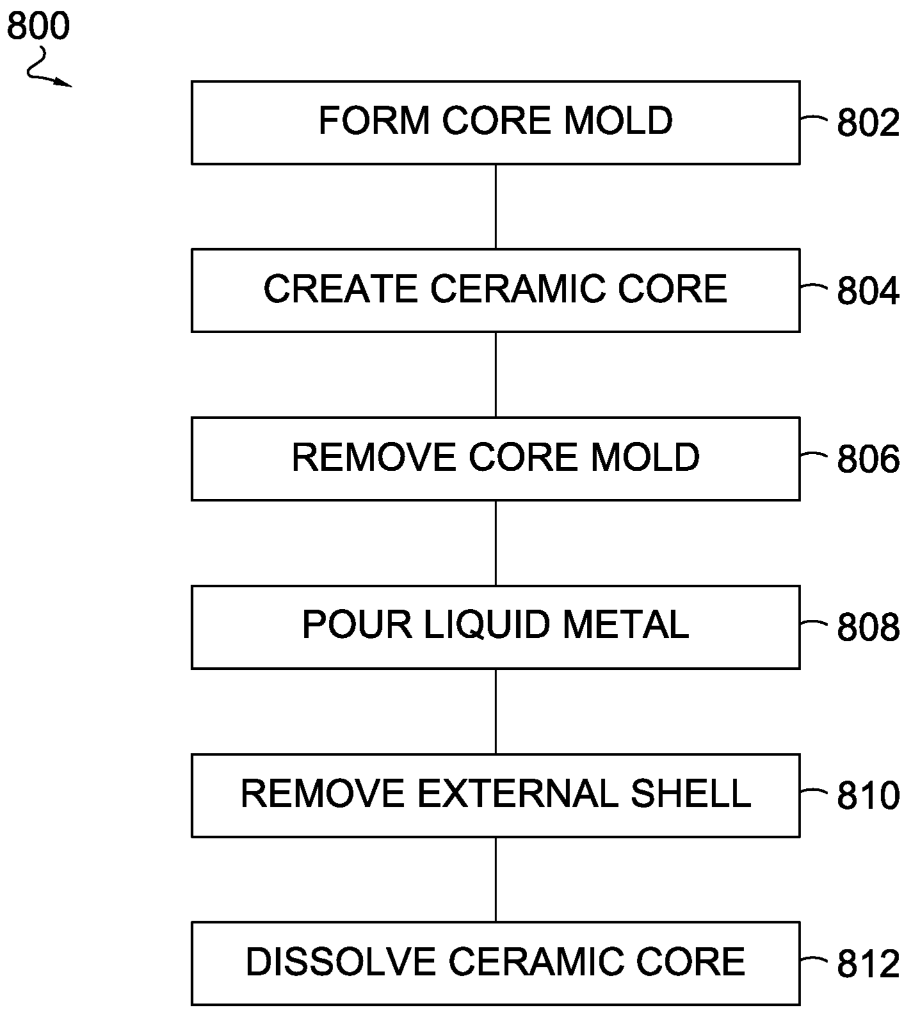
FIG. 8 depicts a method of making a turbine nozzle, in accordance with aspects hereof.

To make the airfoil 56, an investment casting process may be used. The method includes shaping the airfoil in wax by enveloping a conventional alumina or silica based ceramic core as shown at block 802 of the method 800 in FIG. 8. The core defines the cooling cavity 70, the crossover passages 86, and the pin array 90. In other words, the core defines the open chambers internal to the airfoil 56. The wax assembly is then serially dipped a number of times in liquid ceramic solution to create a ceramic shell, as shown at block 804. After each dip, the part is allowed to dry, forming a hard shell, typically a conventional zirconia based ceramic shell. After all dips are complete, the assembly is placed in a furnace to melt out the wax and remove the core, as shown at block 806.

At this stage, the mold includes an internal ceramic core and an outer ceramic shell surrounding the internal ceramic core. The cavity between the core and the outer shell defines the airfoil and the crossover walls 88 and the pins 94 within pin array 90, among other features. The mold is again placed in the furnace, and liquid metal, such as a superalloy based on Nickel or Cobalt, is poured into the mold, as shown at block 808. The molten metal enters the space between the ceramic core and the ceramic shell, previously filled by the wax. After the metal is allowed to cool and solidify, the external shell is broken and removed, as shown at block 810. The casting is then placed in a leeching tank, where the core is dissolved, such as by exposure to an alkaline material, as shown at block 812. Some features of airfoil 56 may be made after the casting process. For example, features such as cooling apertures 82 and exit ports 96 may be machined into the nozzle 50 after the casting process.

Embodiment 1. An airfoil for a gas turbine engine, the airfoil comprising: a leading edge; a trailing edge; a pressure sidewall extending from the leading edge to the trailing edge; a suction sidewall extending from the leading edge to the trailing edge, wherein the pressure sidewall and the suction sidewall define a perimeter of the airfoil; a cooling cavity defined between the pressure sidewall and the suction sidewall and positioned between the leading edge and the trailing edge; a pin array positioned between the cooling cavity and the trailing edge; and a column of crossover passages positioned between the cooling cavity and the pin array.

Embodiment 2. The airfoil of embodiment 1, wherein the airfoil comprises a portion of a turbine nozzle.

Embodiment 3. The airfoil of any of embodiments 1-2, wherein the turbine nozzle includes an inner platform and an outer platform on opposite sides of the airfoil, wherein the outer platform includes an aperture aligned with the cooling cavity of the airfoil.

Embodiment 4. The airfoil of any of embodiments 1-3, wherein the airfoil is comprised of a superalloy based on Cobalt or Nickel.

Embodiment 5. The airfoil of any of embodiments 1-4, further comprising a second cooling cavity defined between the pressure sidewall and the suction sidewall and positioned between the leading edge and the cooling cavity.

Embodiment 6. The airfoil of any of embodiments 1-5, further comprising a rib wall extending between the pressure sidewall and the suction sidewall and from the top of the cooling cavity to the bottom of the cooling cavity.

Embodiment 7. The airfoil of any of embodiments 1-6, further comprising: a first insert positioned within the cooling cavity; a second insert positioned within the second cooling cavity, wherein the first insert and the second insert are configured to induce impingement cooling of the pressure sidewall and the suction sidewall with coolant received in the cooling cavity and the second cooling cavity, respectively.

Embodiment 8. The airfoil of any of embodiments 1-7, further comprising a plurality of cooling holes formed in at least one of the pressure sidewall and the suction sidewall proximate the trailing edge, wherein the cooling holes are adapted for expelling coolant received in the cooling cavity out from the airfoil.

Embodiment 9. The airfoil of any of embodiments 1-8, wherein the pin array comprises a plurality of pins extending from the pressure sidewall to the suction sidewall.

Embodiment 10. The airfoil of any of embodiments 1-9, wherein the plurality of pins comprise four columns of pins.

Embodiment 11. The airfoil of any of embodiments 1-10, wherein the pin array is adjacent to the trailing edge.

Embodiment 12. The airfoil of any of embodiments 1-11, wherein the column of crossover passages are configured to communicate coolant from the cooling cavity to the pin array to provide both convective cooling and impingement cooling of a plurality of pins of the pin array.

Embodiment 13. The airfoil of any of embodiments 1-12, wherein the column of crossover passages extend in a direction perpendicular to a direction of extension of the plurality of pins of the pin array.

Embodiment 14. A method of manufacturing a nozzle for a gas turbine engine, the method comprising: providing a core, wherein the core comprises a cooling cavity portion, a pin array portion, and a crossover column portion positioned between the cooling cavity portion and the pin array portion; positioning the core within a mold, wherein the mold defines a shape of the nozzle; casting the nozzle by inserting material into the mold and around the core; and removing the core from the cast nozzle Embodiment 15. The method of embodiment 14, wherein the cooling cavity portion is shaped to define a cooling cavity configured to receive a supply of coolant and receive an insert that directs the coolant received therein.

Embodiment 16. The method of any of embodiments 14-15, wherein the pin array portion is shaped to define a pin array that includes a plurality of pins that extend from a pressure sidewall of the nozzle to a suction sidewall of the nozzle.

Embodiment 17. The method of any of embodiments 14-16, wherein the crossover column portion is shaped to define a column of crossover passages configured to communicate coolant from the cooling cavity towards the pin array to induce impingement cooling and convective cooling of the pin array.

Embodiment 18. The method of any of embodiments 14-17, wherein the core is comprised of a ceramic material.

Embodiment 19. The method of any of embodiments 14-18, wherein the core is removed from the cast nozzle by exposure to an alkaline material.

Embodiment 20. The method of any of embodiments 14-19, further comprising forming cooling holes in at least one of a pressure sidewall of the nozzle and a suction sidewall of the nozzle proximate a trailing edge of the nozzle.

Embodiment 21. Any of the aforementioned embodiments 1-20, in any combination.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. An airfoil for a land-based, industrial-use gas turbine engine, the airfoil comprising:

a leading edge;

a trailing edge having a length;

a pressure sidewall extending from the leading edge to the trailing edge, the pressure sidewall having a first edge along the trailing edge;

a suction sidewall extending from the leading edge to the trailing edge, the suction sidewall having a first edge along the trailing edge, wherein the pressure sidewall and the suction sidewall define a perimeter of the airfoil;

a cooling cavity defined between the pressure sidewall and the suction sidewall and positioned between the leading edge and the trailing edge, the cooling cavity having a supply opening at a radially outer portion of the airfoil for communicating a coolant into the cooling cavity;

a second cooling cavity defined between the pressure sidewall and the suction sidewall and positioned between the leading edge and the cooling cavity, the second cooling cavity having a second supply opening at the radially outer portion of the airfoil for communicating a coolant into the second cooling cavity;

a plurality of cooling apertures formed in at least one of the pressure sidewall and the suction sidewall proximate the leading edge, wherein the cooling apertures are adapted for expelling coolant received in the second cooling cavity out from the airfoil;

a rib wall extending between the pressure sidewall and the suction sidewall and from the top of the cooling cavity to the bottom of the cooling cavity, the rib wall separating the cooling cavity from the second cooling cavity;

an exit section defined between the pressure sidewall and the suction sidewall and positioned between the trailing edge and the cooling cavity;

a crossover wall extending between the pressure sidewall and the suction sidewall and from the top of the cooling cavity to the bottom of the cooling cavity, the crossover wall positioned at the forward end of the exit section and separating the cooling cavity from the exit section;

a plurality of crossover passages formed through the crossover wall;

a pin array positioned in the exit section adjacent the crossover wall;

the first edge of the suction sidewall and the first edge of the pressure sidewall converging into a unitary structure along the length of trailing edge; and a plurality of exit ports formed via a post-casting process through the unitary structure and configured to communicate cooling air out of the airfoil.

2. The airfoil of claim 1, wherein the airfoil comprises a portion of a turbine nozzle.

3. The airfoil of claim 2, wherein the turbine nozzle includes an inner platform and an outer platform on opposite sides of the airfoil, wherein the outer platform includes an aperture aligned with the supply opening of the cooling cavity and a second aperture aligned with the second supply opening of the second cooling cavity.

4. The airfoil of claim 1, wherein the airfoil is comprised of superalloy based on Cobalt or Nickel.

5. The airfoil of claim 1, further comprising:

a first insert positioned within the cooling cavity;

a second insert positioned within the second cooling cavity, wherein the first insert and the second insert are configured to induce impingement cooling of the pressure sidewall and the suction sidewall with coolant received in the cooling cavity and the second cooling cavity, respectively.

6. The airfoil of claim 1, wherein the pin array comprises a plurality of pins extending from the pressure sidewall to the suction sidewall.

7. The airfoil of claim 6, wherein the plurality of pins comprise four columns of pins.

8. The airfoil of claim 1, wherein the pin array is adjacent to the trailing edge.

9. The airfoil of claim 1, wherein the plurality of crossover passages are configured to communicate coolant from the cooling cavity to the exit section to provide both convective cooling and impingement cooling of a plurality of pins of the pin array.

10. The airfoil of claim 9, wherein the plurality of crossover passages extend in a direction perpendicular to a direction of extension of the plurality of pins of the pin array.

11. The airfoil of claim 1, wherein the post-casting process is machining.

12. The airfoil of claim 1, wherein the post-casting process is an EDM plunge.

* * * * *